US009331858B2

(12) United States Patent
Khan et al.

(10) Patent No.: US 9,331,858 B2
(45) Date of Patent: May 3, 2016

(54) PERSISTENT PARTY ROOMS

(75) Inventors: Mohammed Aafaq Khan, Poway, CA (US); Vinod Tandon, San Diego, CA (US); Hai Jie Hewu, Tokyo (JP); Ramana Bangalore Prakash, San Diego, CA (US); Yasutaka Miwa, Tokyo (JP); Mark Fortuna, Cardiff-by-the-Sea, CA (US); Scott Kirkland, Warrington (GB); Christopher Reese, Bend, OR (US)

(73) Assignee: SONY COMPUTER ENTERTAINMENT INC., Tokyo (JP)

( * ) Notice: Subject to any disclaimer, the term of this patent is extended or adjusted under 35 U.S.C. 154(b) by 469 days.

(21) Appl. No.: 13/099,923

(22) Filed: May 3, 2011

(65) Prior Publication Data
US 2012/0284651 A1    Nov. 8, 2012

(51) Int. Cl.
G06F 17/30      (2006.01)
H04L 12/18      (2006.01)
A63F 13/30      (2014.01)

(52) U.S. Cl.
CPC ............ *H04L 12/1813* (2013.01); *A63F 13/12* (2013.01); *A63F 2300/5526* (2013.01); *A63F 2300/572* (2013.01); *A63F 2300/636* (2013.01)

(58) Field of Classification Search
CPC ................ G06F 17/30867; G06F 17/30864; G06F 17/30817; G06F 3/1423; G06F 17/30283; G06F 17/30887
See application file for complete search history.

(56) References Cited

U.S. PATENT DOCUMENTS

| 6,640,284 | B1 | 10/2003 | Shaw et al. |
| 6,938,069 | B1 * | 8/2005 | Narayanaswamy .......... 709/204 |
| 7,275,215 | B2 * | 9/2007 | Werndorfer ............ G06F 3/167 715/752 |
| 2002/0002586 | A1 * | 1/2002 | Rafal et al. .................... 709/205 |
| 2002/0142842 | A1 * | 10/2002 | Easley et al. ..................... 463/42 |
| 2004/0215756 | A1 * | 10/2004 | VanAntwerp et al. ......... 709/223 |
| 2004/0243682 | A1 * | 12/2004 | Markki et al. ................. 709/207 |
| 2004/0260781 | A1 | 12/2004 | Shostack et al. |
| 2005/0043097 | A1 * | 2/2005 | March et al. ..................... 463/42 |
| 2005/0188090 | A1 | 8/2005 | Washburn |
| 2007/0173325 | A1 * | 7/2007 | Shaw et al. ..................... 463/42 |
| 2008/0019353 | A1 * | 1/2008 | Foote ........................... 370/352 |
| 2008/0059580 | A1 | 3/2008 | Kalinowski et al. |
| 2008/0120419 | A1 | 5/2008 | Yamartino et al. |
| 2008/0155615 | A1 * | 6/2008 | Craner et al. ................... 725/91 |
| 2008/0300045 | A1 | 12/2008 | Ratcliff |

(Continued)

FOREIGN PATENT DOCUMENTS

WO    2009010958    1/2009

OTHER PUBLICATIONS

Supplemental Partial European Search Report, EP Application No. 12875762, European Patent Office, Mar. 15, 2013.

*Primary Examiner* — Angelica Ruiz
(74) *Attorney, Agent, or Firm* — Procopio, Cory, Hargreaves & Savitch, LLP

(57) ABSTRACT

Using persistent party rooms, including: initializing, via a computing device, a global array according to a hierarchical server architecture; determining, via the computing device, whether or not to create a new persistent party room or to join a previously bookmarked persistent party room; creating, via the computing device, the new persistent party room within a position indexed in the global array; and joining, via the computing device, the previously bookmarked persistent party room by searching for the previously bookmarked party room utilizing the global array.

17 Claims, 9 Drawing Sheets

(56) References Cited

U.S. PATENT DOCUMENTS

| | | |
|---|---|---|
| 2009/0005150 A1 | 1/2009 | Haveson |
| 2009/0019137 A1* | 1/2009 | Mishra et al. ............... 709/220 |
| 2009/0106376 A1 | 4/2009 | Tom et al. |
| 2009/0138601 A1* | 5/2009 | Hebert et al. ............... 709/226 |
| 2010/0093443 A1 | 4/2010 | Yan et al. |
| 2010/0205541 A1 | 8/2010 | Rapaport et al. |
| 2010/0222147 A1* | 9/2010 | Langan et al. ............... 463/42 |
| 2011/0105232 A1* | 5/2011 | Godfrey et al. ............... 463/42 |
| 2011/0208822 A1 | 8/2011 | Rathod |
| 2011/0225511 A1* | 9/2011 | Xu ............................... 715/753 |
| 2012/0270660 A1* | 10/2012 | Walker et al. ............... 463/40 |

\* cited by examiner

PERSISTENT PARTY ROOMS

BACKGROUND

1. Field of the Invention

The present application relates to online gaming environments, and more specifically, to party rooms or chat rooms used while playing games.

2. Background

Party rooms are online chat environments where gamers may voice chat, text chat, video chat, etc., while playing games or online games, during a game or during a break in a game. One of the problems with party rooms is that they are transitory and do not persist from session to session. Currently, party rooms must be recreated anew by the user whenever everyone leaves a room and when anyone wants to return to that party room or join a new one. This approach may be inefficient from an end-user point of view.

SUMMARY

Implementations of the present application provide for persistent party rooms that are persistent and that can be bookmarked and returned.

In one implementation, provided is a method for using persistent party rooms, including: initializing, via a computing device, a global array according to a hierarchical server architecture; determining, via the computing device, whether or not to create a new persistent party room or to join a previously bookmarked persistent party room; creating, via the computing device, the new persistent party room within a position indexed in the global array; and joining, via the computing device, the previously bookmarked persistent party room by searching for the previously bookmarked party room utilizing the global array.

In another implementation, provided is a non-transitory computer-readable storage medium storing a computer program, the computer program including executable instructions that cause a computer to perform a method for using persistent party rooms, the method including: initializing a global array according to a hierarchical server architecture; determining whether or not to create a new persistent party room or to join a previously bookmarked persistent party room; creating the new persistent party room within a position indexed in the global array; and joining the previously bookmarked persistent party room by searching for the previously bookmarked party room utilizing the global array.

In yet another implementation, provided is a system of using persistent party rooms, including: at least one computer system including persistent party room software; at least one server storing persistent party room information to be interfaced with the persistent party room software; and a network connecting the at least one computer system and the at least one server.

Other features and advantages of the present application will become more readily apparent to those of ordinary skill in the art after reviewing the following detailed description and accompanying drawings.

DETAILED DESCRIPTION

Figure 1:
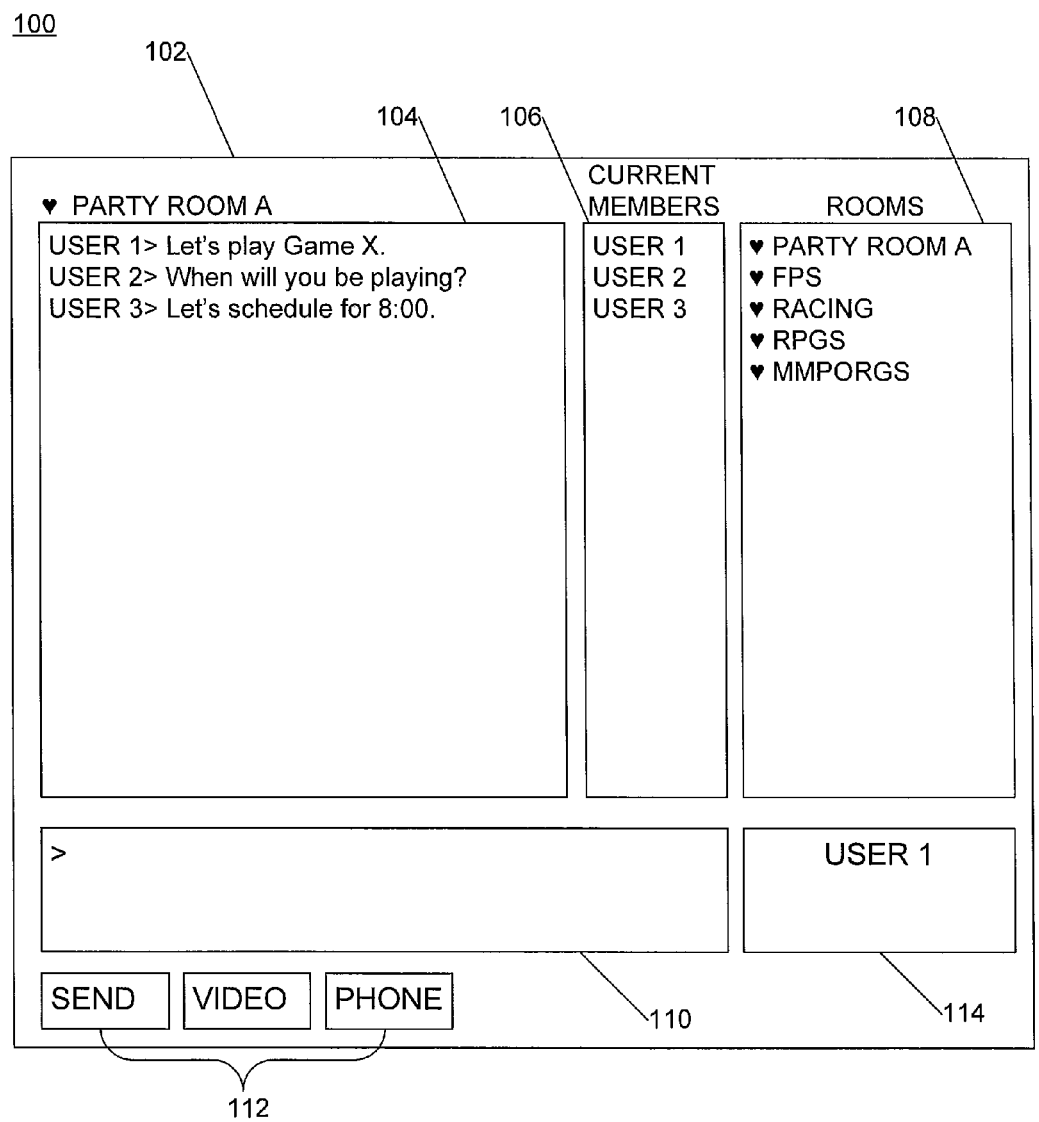
FIG. 1 illustrates a screen shot of an example persistent party room in accordance with an implementation of the present application.

Certain implementations as disclosed herein provide for persistent party rooms. After reading this description it will become apparent how to implement the present application in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present application.

In one implementation, a persistent party room is a pseudo-permanent party room that may appear to the user as a permanent party room but may be destroyed and then created when any user returns to the party room, which can be bookmarked. The party room is used to keep friends or online players together while they jump from game to game and still engage in voice chat, text chat, video chat, etc., even if they are playing different titles. With persistent party rooms, friends may bookmark or save a party room in order to easily join the same party room again at a later time.

A bookmarked persistent party room is a central place friends coordinate to go when they are in the mood to play games with one another. For instance, a bookmarked persistent party room could be named "FPS" for friends of a user who like to play First Person Shooters, or a room called "Racing" for friends who like to play racing games. A user can then join any of the persistent party rooms depending on which game the user wishes to play, the user's mood, or which persistent party room may have more or less people in it. The backend of software used to administer persistent party rooms stores an associated unique ID of the persistent party room. When a user wishes to join a persistent party room, the system searches to determine if a bookmark of the associated unique ID exists. If a bookmark does not exist, a new associated unique ID is created. This approach conserves resources by keeping these persistent party rooms always around. To the user, it appears as if the persistent party rooms always exist, but in reality they are destroyed when everyone leaves the persistent party room (saved and bookmarked by a pointer representing the associated unique ID) and then created again when the first user joins the bookmarked persistent party room, where the associated unique ID of the persistent party room is looked up by the system.

Currently, a party room implementation allows a user to create one party room which friends can then be invited to join or be allowed to join, usually via some search. When all the users have left the party room, it is destroyed. When a user then wishes to enter the party room, the party room is recreated by the user.

The persistent party room as disclosed by the present application solves this inefficiency problem by bookmarking or saving a persistent party room via an associated unique ID so that it can be quickly referenced or used at a later time. Users may be able to create different types of persistent party rooms centering around different types of activities with their friends. Additionally, if friends are having a good time in a persistent party room, they can choose to bookmark the persistent party room and coordinate their activity so that all or some of their friends join them in the same persistent party room the next time they are available to play. The scheduling of games is further made convenient by using a joined game acknowledgment feature in tandem with the persistent party rooms, so slots in games are reserved beforehand.

In one implementation, provided is persistent party room software that may be stored and executed by a computer system to create persistent party rooms where users can group together to play games, text chat, voice chat, video chat, etc. In one implementation, the computer system may be a next generation game console such as consoles from, for example, Sony Playstation®.

FIG. 1 illustrates a screen shot of an example persistent party room 100, according to an implementation of the present application. Persistent party room 100 includes current persistent party room toolbar 102, persistent party room chat box 104, current member list 106, persistent party room list 108, user chat GUI window 110, user chat buttons 112, and user information box 114. When a user launches the persistent party room application, a screen that may appear similar to persistent party room 100 comes up.

Current persistent party room toolbar 102 displays which persistent party room the user is currently in. The heart icon in 102 may be grayed out if the current persistent party room has not been bookmarked. If the user touches the grayed heart icon, the heart icon will turn red, and the current persistent party room will be bookmarked and the relevant bookmark data information (such as the associated unique ID of the room) may be saved to local storage. The bookmark information saved in local storage may be compared against the bookmark information for party rooms that are occupied by friends or other users.

Current member list 106 shows the users or friends who are currently in the present persistent party room. If the room occupied by a user matches a room that has previously been bookmarked, the heart icon in 102 turns to red next to the name of the room. Furthermore, touching a user listed in current member 106 would bring up a profile of that user in a user information box. In one implementation, a user information box would hover near a cursor if the cursor was positioned over a user's name. In another implementation, clicking a user's name would open up another page showing a user information box, or open up a smaller window showing the user information box.

Persistent party room list 108 provides a list of bookmarked rooms so that the user can decide to join them at anytime. The heart icons next to the room names also indicate whether or not a room has been bookmarked. If a bookmarked party room does not exist and the user wishes to create one, then the persistent party room will be created on the server with an associated unique ID.

User chat GUI window 110 allows a user to type in text, videos, links, or other information, to communicate with other users. User chat buttons 112 reflect various modes of communicating with other users (text, video, phone, etc.), and these modes of communication are not limited to the buttons shown. User information box 114 compiles information about the current user.

Figure 2:
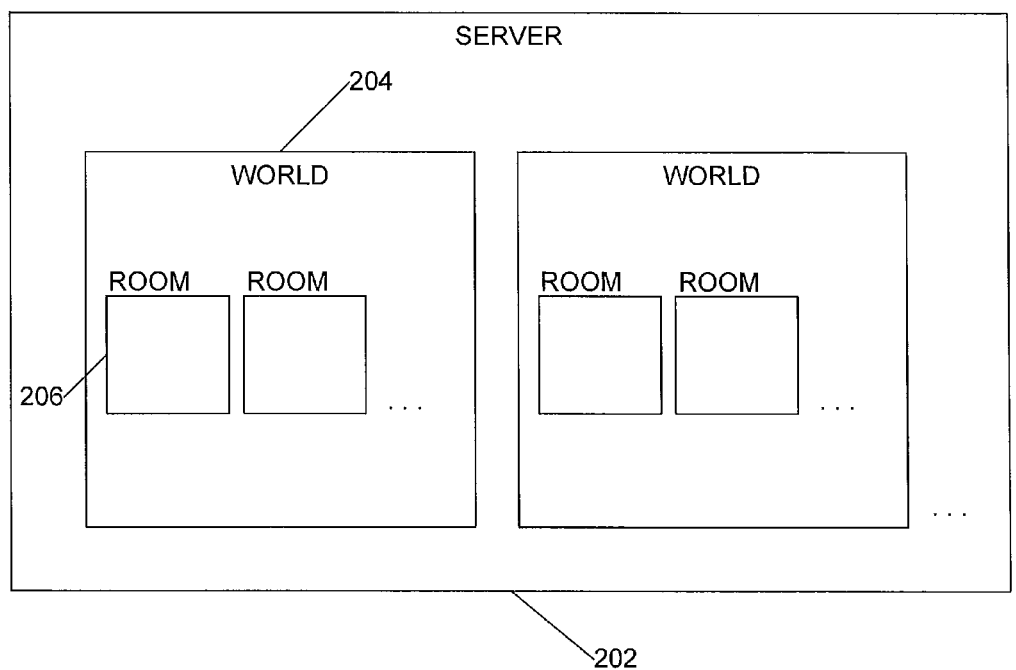
FIG. 2 illustrates a server architecture in accordance with an implementation of the present application.

FIG. 2 illustrates a server architecture in accordance with an implementation of the present application. Specifically, FIG. 2 illustrates server architecture 200 which shows at least one server 202, each of the servers 202 having at least one world 204, and each of the worlds 204 having at least one room 206.

In one implementation, the room 206 is where the persistent party room is stored, and each persistent party room (of room 206) exists in one world 204, which exists on one server 202. In one implementation, each server 202 has multiple worlds 204 in it and each world 204 has multiple rooms 206 in it. Each persistent party room (e.g., room 206) may be created on a particular server 202 and world 204. Each room 206, world 204 and server 202 may have an associated unique ID (e.g., room ID, world ID, server ID). In one implementation, each room ID uses the world ID and the server ID in this unique ID. In another implementation, each world ID uses the server ID inside of its unique ID. In another implementation, each of the IDs can track data about information associated with its other IDs (e.g., each server ID can locate information about its associated world ID and room ID, each world ID can locate information about its associated server ID and room ID, and each room ID can locate information about its associated server ID and world ID).

Figure 3:
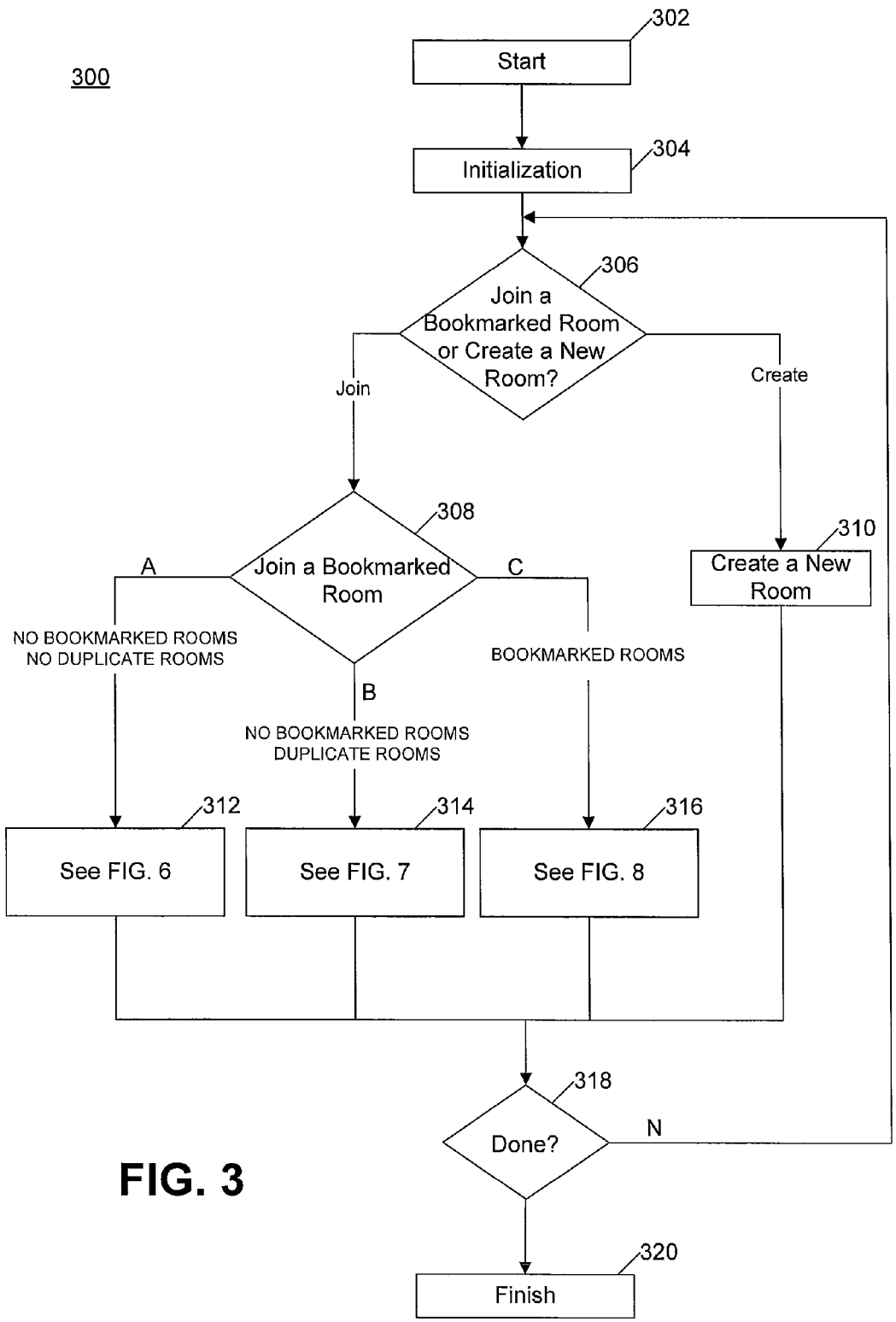
FIG. 3 illustrates a flowchart showing a method for creating and joining persistent party rooms in accordance with an implementation of the present application.

FIG. 3 illustrates a flowchart showing a method 300 for creating and joining persistent party rooms in accordance with an implementation of the present application. In one implementation, method 300 may start in box 302, but may also start from anywhere else in FIG. 3 and the below described boxes may also be performed in any order. In box 304, an initialization process (which is further explained below in conjunction with the description of FIG. 4) is performed.

In decision box 306, a decision is made of whether to join a bookmarked persistent party room or to create a new persistent party room. If the answer to decision box 306 is to create a new persistent party room, then the next box is box 310, where a new persistent party room is created. If the answer to decision box 306 is to join a bookmarked persistent party room, then the next box is decision box 308, which may branch out into at least one of three different scenarios: route A and then box 312, route B and then box 314, or route C and then box 316.

Box 312, after route A, is the scenario where no bookmarked persistent party rooms are found and where no duplicate persistent party rooms are found, and is further explained below in conjunction with the description of FIG. 6. Box 314, after route B, is the scenario where no bookmarked persistent party rooms are found and where duplicate persistent party rooms are found, and is further explained below in conjunction with the description of FIG. 7. Box 316, after route C, is the scenario where bookmarked persistent party rooms are found, and is further explained below in conjunction with the description of FIG. 8.

After box 310 or boxes 312, 314 or 316, the next box is decision box 318, which inquires as to whether or not the method 300 is done processing (i.e., whether or not any more persistent party rooms should be created or joined). If the answer to decision box 318 is no, then the method 300 goes back to box 306. In one implementation, the above boxes may be performed by a system implementing the persistent party room software or techniques discussed in the present application.

Figure 4:
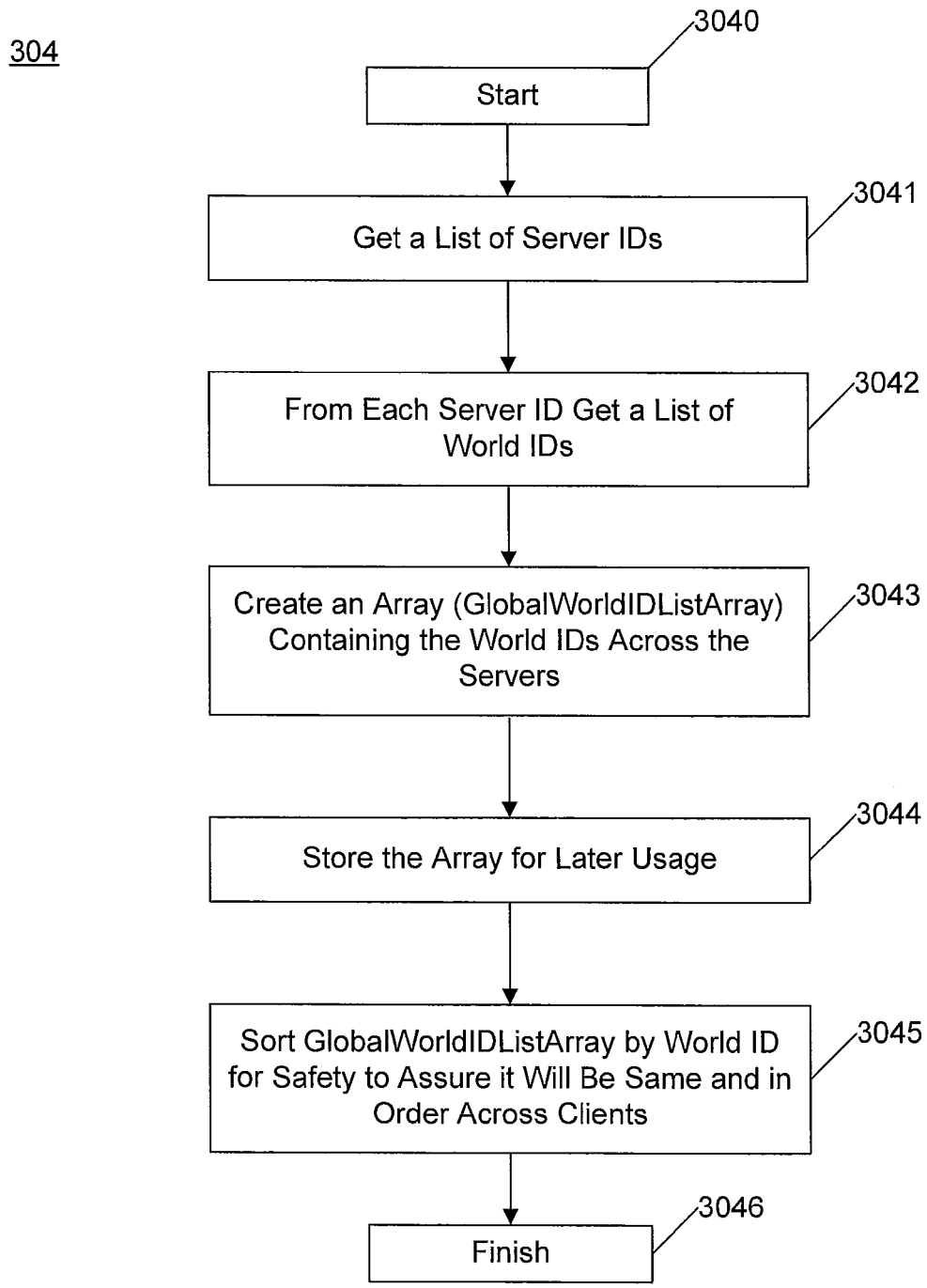
FIG. 4 illustrates a flowchart showing an initialization method in accordance with an implementation of the present application.

FIG. 4 illustrates a flowchart showing an initialization method of box 304 (FIG. 3) in accordance with an implementation of the present application. In one implementation, box 3040 may continue from the box 302 in FIG. 3. In one implementation, the below-described method may start in box 3040, but may also start from anywhere else in FIG. 4 and the below described boxes may also be performed in any order. Box 3041 gets a list of server IDs. In box 3042, a list of world IDs is received from each server ID. In box 3043, an array (entitled, for example, GlobalWorldIDListArray) is created that includes the world IDs across the servers. For example, if there are two servers having four worlds each, the list for the world IDs across the servers would have eight items total. In box 3044, the array is stored for later usage, for example, when persistent party rooms are created (as further detailed below). In box 3045, the array may also be sorted by world ID for safety in order to assure that the array would be uniform and substantially similar (e.g., having the same order) across clients. Then everything finishes in box 3046, and in one implementation the next box from box 3046 may be box 306 in FIG. 3.

In one implementation, the above-described process may get a list of all server IDs, from each server ID get a list of all world IDs, create an array containing all the world IDs across all the servers, and sort the array for safety to assure it will be the same and in order across all clients.

Figure 5:
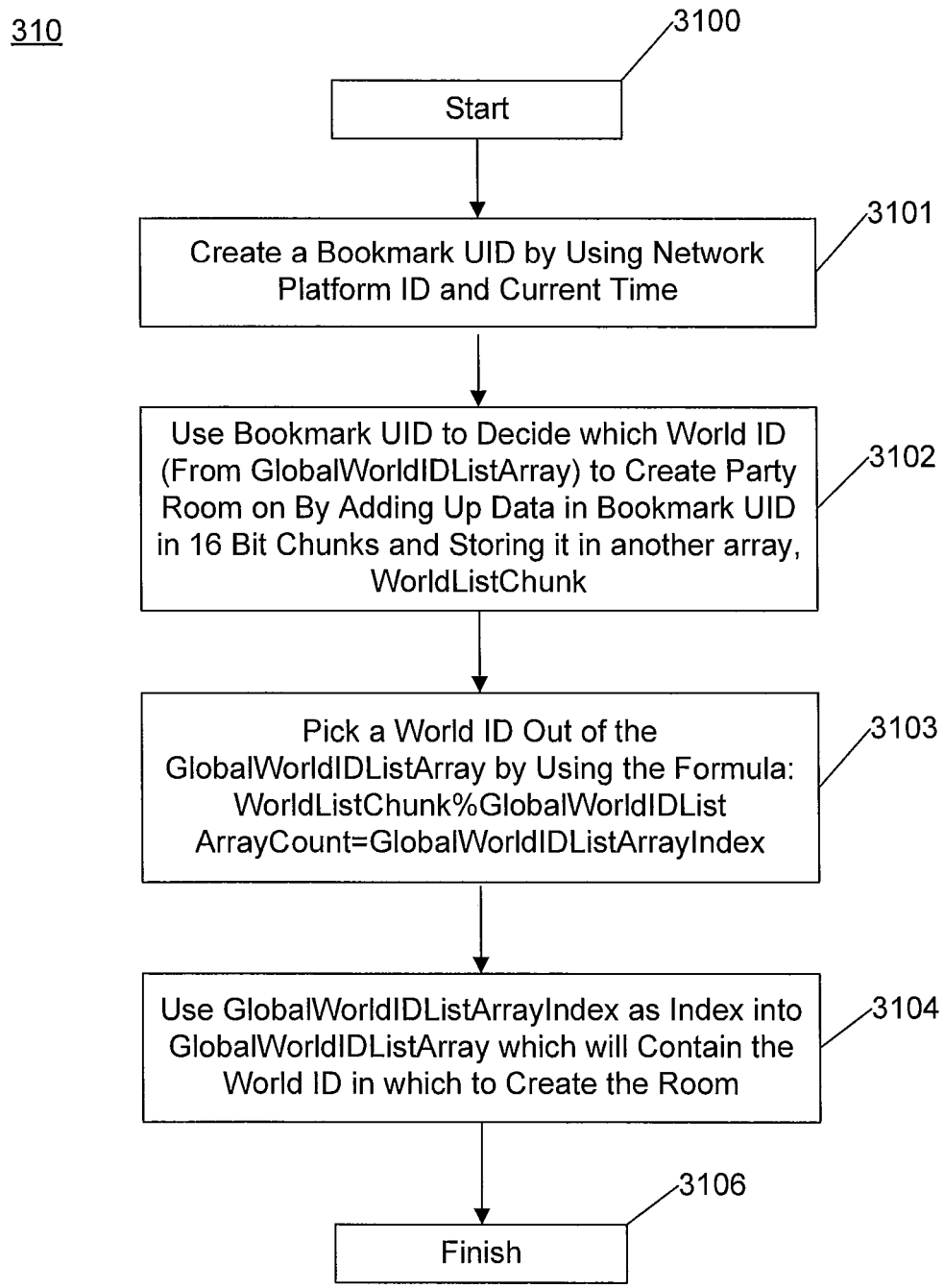
FIG. 5 illustrates a flowchart showing a method to create a new persistent party room in accordance with an embodiment of the present application.

FIG. 5 illustrates a flowchart showing a method to create a new persistent party room of box 310 (FIG. 3) in accordance with an embodiment of the present application. In one implementation, box 3100 may continue from box 306 in FIG. 3. In one implementation, the below-described method may start in box 3100, but may also start from anywhere else in FIG. 5 and the below described boxes may also be performed in any order. In box 3101, a bookmark UID (user ID) is created by using a network platform ID and the current time. In one implementation the bookmark UID may be a data structure that contains the network platform ID and a snapshot of the current time. The network platform ID is just the user name or login name for the current user who is logged into the network utilized by the persistent party room software.

In one implementation, the bookmark UID is approximately 64 bytes of data. The bookmark UID may also be used to decide which world ID (from the array, e.g., GlobalWorldIDListArray) to create a persistent party room in. In box 3102, the bookmark UID is used to decide in which world ID from the array to create a persistent party room by adding up the data contained in the bookmark UID, for example, in 16 bit chunks and storing it in another world list array (entitled, for example, WorldListChunk). In one implementation, the word list array may be another 16 bit (or 2 byte) value, and all the bytes in the bookmark UID structure are summed up and saved as a 16 bit value named, for example, WorldListChunk. The overflow that may occur during summing up is arbitrary, and the goal is to obtain some randomness by using all the bytes in the bookmark UID structure. Then, in box 3103, a world ID is indexed or picked out of the GlobalWorldIDListArray by using, for example, the following formula: WorldListChunk % Count(GlobalWorldIDListArray)=GlobalWorldIDListArrayIndex, where GlobalWorldIDListArrayIndex represents an index into the GlobalWorldIDListArray and also contains the world ID in which to create the persistent party room, and where represents the modulo operator and also where Count is the length of the GlobalWorldIDListArray. Therefore, the bookmark UID is used to index into the GlobalWorldIDListArray. In box 3104, GlobalWorldIDListArrayIndex is used as an index into the GlobalWorldIDListArray, which will contain the world ID in which to create the persistent party room. Then, in box 3106 the process finishes, and in one implementation the next box may be box 318 in FIG. 3.

Figure 6:
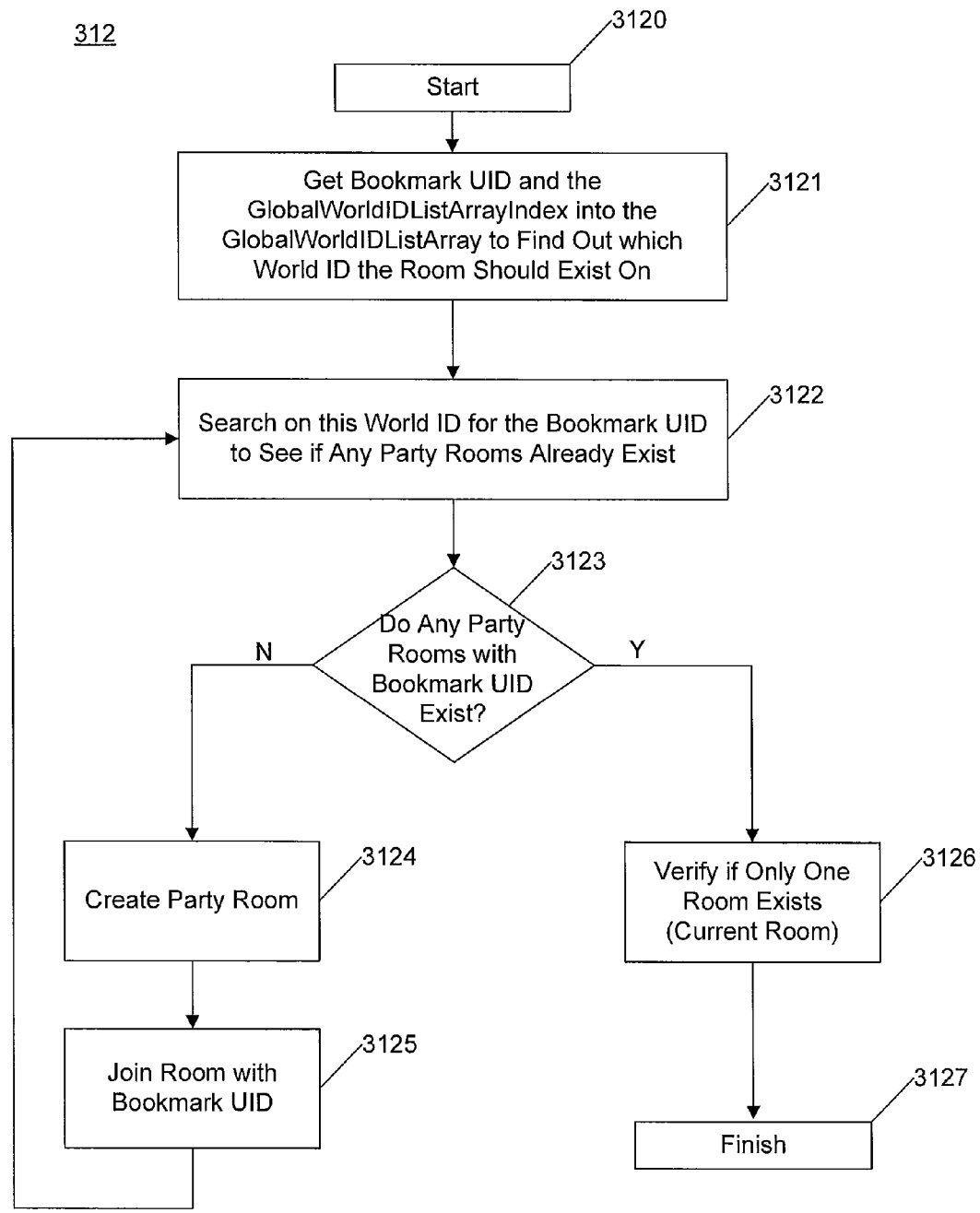
FIG. 6 illustrates a flowchart showing a method that occurs for a first route when a bookmarked room is joined, in accordance with an implementation of the present application.

FIG. 6 illustrates a flowchart showing a method of box 312 (FIG. 3) that occurs for a first route when a bookmarked room is joined, in accordance with an implementation of the present application. Box 312 follows route A in FIG. 3. In one implementation, box 3120 may continue from decision box 308 in FIG. 3. In one implementation, the below-described method may start in box 3120, but may also start from anywhere else in FIG. 6 and the below described boxes may also be performed in any order. Box 3121 gets the bookmark UID and the GlobalWorldIDListArrayIndex within the GlobalWorldIDListArray to determine on which world ID that the persistent party room should exist. In box 3122, a search is performed on this world ID for the bookmark UID (which may be, in one implementation, a searchable attribute) to determine if any of the persistent party rooms already exist with the world ID.

In decision box 3123, the branch question is asked whether any of the party rooms with the bookmark UID already exist.

If the answer to decision box 3123 is no, then the next box is box 3124, where a new persistent party room is created. In box 3125, the new persistent party room created in box 3124 is joined with the bookmark UID, and then the method goes back to box 3122 to perform another search to determine how many persistent party rooms exist with the current bookmark UID. Then, boxes 3123 and 3126 may be repeated to finish in box 3127. In one implementation, the answer to decision box 3123 on the first pass may be a no.

However, if the answer to decision box 3123 is yes, then the next box is box 3126, which verifies if only one persistent party room exists (the current persistent party room) with the same bookmark UID as above. If only one persistent party room exists, then the method finishes in box 3127, and in one implementation may go onto box 318 in FIG. 3. In one implementation, the answer to decision box 3123 may be yes on the first pass which would imply more than one bookmarked room was found.

Figure 7:
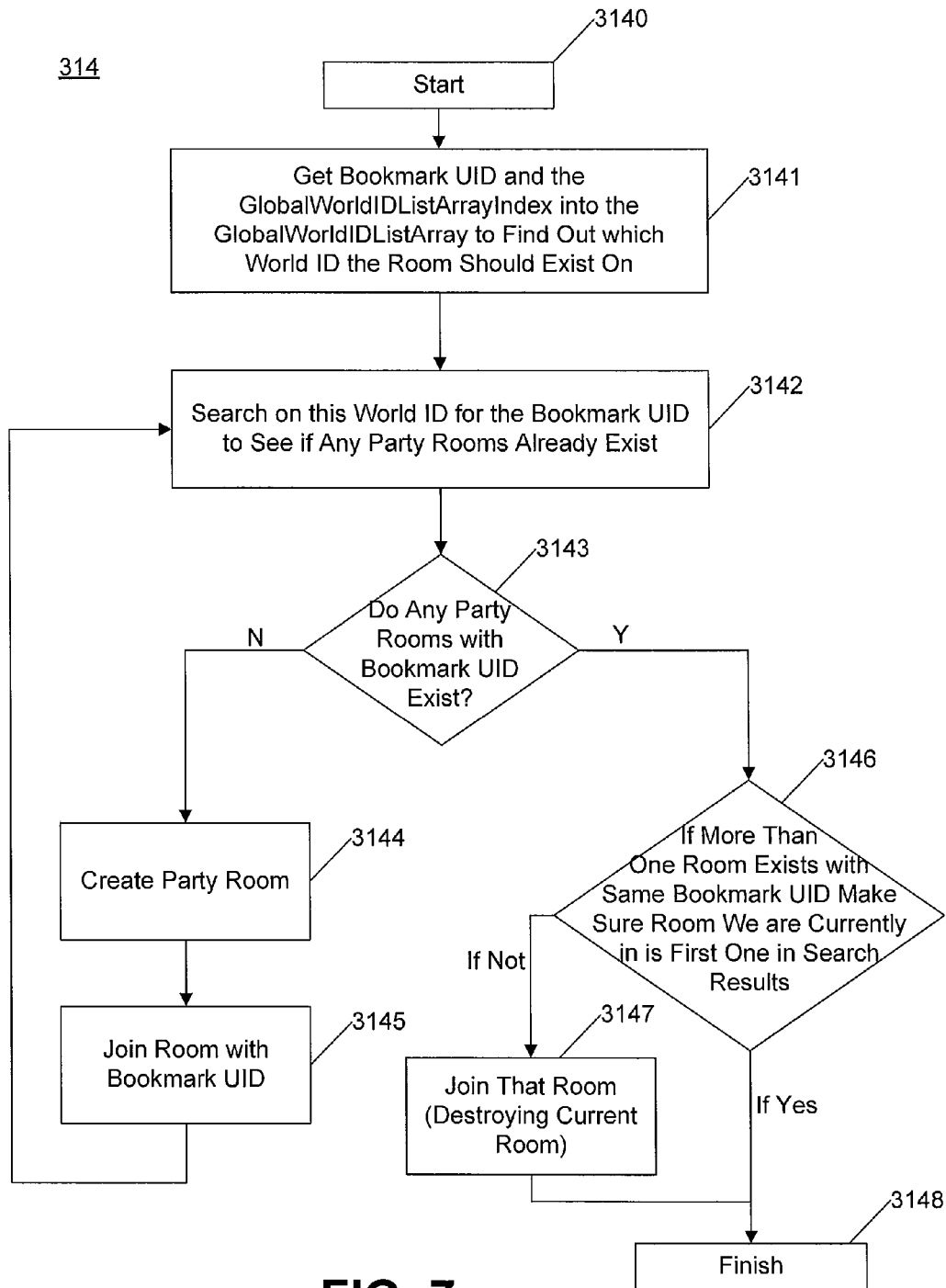
FIG. 7 illustrates a flowchart showing a method that occurs for a second route when a bookmarked room is joined, in accordance with an implementation of the present application.

FIG. 7 illustrates a flowchart showing a method of box 314 (FIG. 3) that occurs for a second route when a bookmarked room is joined, in accordance with an implementation of the present application. Box 314 follows route B in FIG. 3. In one implementation, the box 3140 may continue from decision box 308 in FIG. 3. In one implementation, the below-described method may start in box 3140, but may also start from anywhere else in FIG. 7 and the below described boxes may also be performed in any order. Box 3141 gets the bookmark UID and the GlobalWorldIDListArrayIndex within the GlobalWorldIDListArray to determine on which world ID that the persistent party room should exist. In box 3142, a search is performed on this world ID for the bookmark UID (which may be, in one implementation, a searchable attribute) to determine if any of the persistent party rooms already exist with the world ID.

In decision box 3143, the branch question is asked whether any of the party rooms with the bookmark UID already exist.

If the answer to decision box 3146 is no, then box 3147 is executed, where the first persistent party room in the search results is joined, effectively destroying or replacing the current persistent party room with the joined persistent party room. Then, the method finishes in box 3148 and may proceed onto box 318 in FIG. 3. In one implementation, the answer to decision box 3146 on the first pass may be a no.

However, if the answer to decision box 3143 is yes, then the method proceeds to decision box 3146. In decision box 3146 a determination is made whether the current persistent party room is the first one that comes up in the search results when more than one persistent party room exists with the same bookmark UID. If the answer to decision box 3146 is yes, then the method finishes in box 3148, which in one implementation may go onto box 318 in FIG. 3. In one implementation, the answer to decision box 3123 may be yes on the first pass which would imply more than one bookmarked room was found.

Going back to decision box 3143, if the answer to decision box 3143 is no, then the method proceeds to box 3144, where a new persistent party room is created. In box 3145, the new persistent party room created in box 3144 is joined with the bookmark UID, and then the method goes back to box 3142 to perform another search to determine how many persistent party rooms exist with the current bookmark UID. Then, boxes 3143, 3146 and 3147 may be repeated to finish in box 3148.

Figure 8:
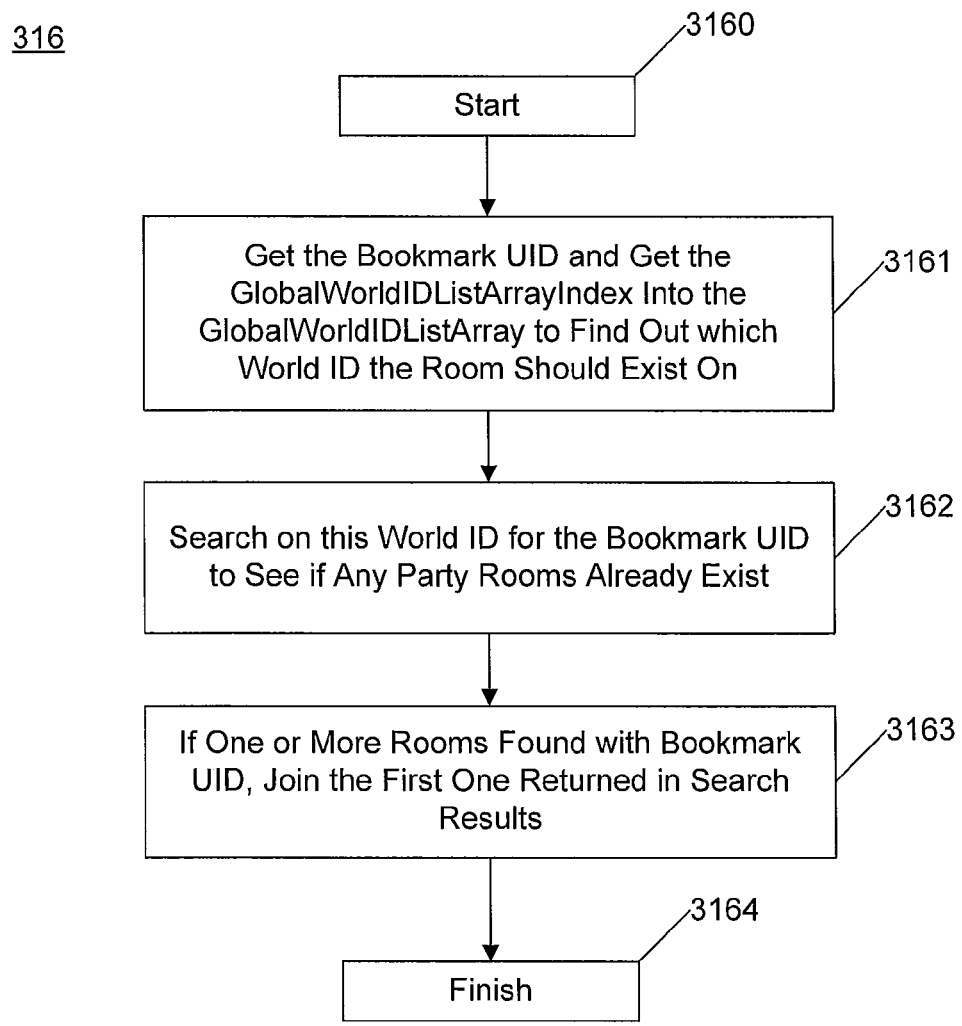
FIG. 8 illustrates a flowchart showing a method that occurs for a third route when a bookmarked room is joined, in accordance with an implementation of the present application.

FIG. 8 illustrates a flowchart showing a method of box 316 (FIG. 3) that occurs for a third route when a bookmarked room is joined, in accordance with an implementation of the present application. Box 316 follows route C shown in FIG. 3. In one implementation, box 3160 may continue from decision box 308 in FIG. 3. In one implementation, the below-described method may start in box 3160, but may also start from anywhere else in FIG. 8 and the below described boxes may also be performed in any order. Box 3161 gets the bookmark UID and the GlobalWorldIDListArrayIndex into the GlobalWorldIDListArray to determine on which world ID the persistent party room should exist. In box 3162, a search is performed on this world ID for the bookmark UID (which may be, in one implementation, a searchable attribute) to determine if any of the persistent party rooms already exist with the world ID. In box 3163, if one or more rooms are found with the bookmark UID, then the first one returned in the search results is joined. In one implementation, it is assumed that the search results, which may be shown as room IDs—which specify which persistent party room to join, will always return the same bookmark UID in the same order for box 3163. If this is not the case, the persistent party rooms in GlobalWorldIDListArray can be sorted by room ID, for example, when GlobalWorldIDListArray is initialized, and the first room in the sorted search results may be used as a result. After box 3163, the method finishes in box 3164, which in one implementation may continue on to box 318 in FIG. 3.

In one implementation, a joined game acknowledgment feature may be integrated into the persistent party rooms. Essentially, a joined game acknowledgment is a feature that may be supported by certain games. The joined game acknowledgment feature allows a player playing a game to reserve a slot for another player, without having to take the player's attention off the current game being played. That is, the reservation and organization of the slots is done behind the scenes. For instance, player A is playing a game while player B is interested in joining the same game player A is playing. Instead of waiting for an open slot to become available and waiting around with an open game screen or instead of unnecessarily launching into the game only to found out that by the time Player B's game was loaded, Player A's game is now full, player B may use the joined game acknowledgment feature to reserve a slot in the game beforehand. Player B may also get a dialogue or dialogue box stating that Player A's game is full before even attempting to launch Player A's game. The game has the joined game acknowledgment feature, and works behind the scenes without having to get player A involved to reserve a spot beforehand for player B. Player B is then sent an acknowledgment that a given spot is reserved.

In one implementation, the joined game acknowledgment feature supports an NP basic system. In one implementation, NP Basic may be a system that allows for the sending/receiving of game presence (online/offline status of friends, for example), and also allows for the sending/receiving of game presence in a joinable game or a non-joinable game (e.g., single player game). In a joinable game, the game presence may contain the details of the online game session that other friends can join into. The joined game acknowledgment feature may be used in tandem with persistent party rooms and all types of party rooms (including non-persistent party rooms) so that users waiting in a party room may instantly join active games or reserve spots in active games and not have to wait around for slots to open. Using the joined game acknowledgment feature, users in party rooms may also reserve game slots in each other's games as long as they are in the same party. The join game acknowledgment feature further provides a better user experience for the users in any party room since users can immediately know if other games played by party members are full or invalid (e.g., game sessions do not exist anymore). The load times for games can reach several minutes sometimes, so this can be irritating to the user if they must wait for a game to launch before they find out that another party member's game is full or invalid. The join game acknowledgment feature deftly avoids this problem by not having the user wait needlessly for something that may not materialize.

In one implementation, the application programming interface of the persistent party rooms may support NP-Basic systems or NP-Basic program calls. The application programming interface of the persistent party rooms may also be implemented with flags (which may be stored for each party member) that are used to communicate the joined game acknowledgment feature and also whether certain games support the joined game acknowledgment feature and/or whether party members are playing a game that supports the joined game acknowledgment feature. What also may be supported is data describing whether party members in a persistent party room or any other type of party room are playing a given game and what session of the game is currently being played.

Figure 9A:
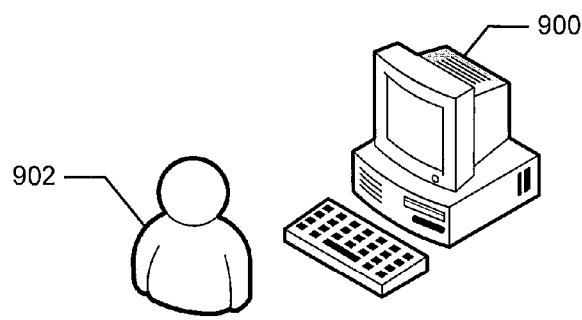
FIG. 9A illustrates a representation of a computer system and a user in accordance with an implementation of the present application.

FIG. 9A illustrates a representation of a computer system 900 and a user 902 in accordance with an embodiment of the present disclosure. The user 902 uses the computer system 900 to create, search or join persistent party rooms. The computer system 900 stores and executes persistent party room software 990.

Figure 9B:
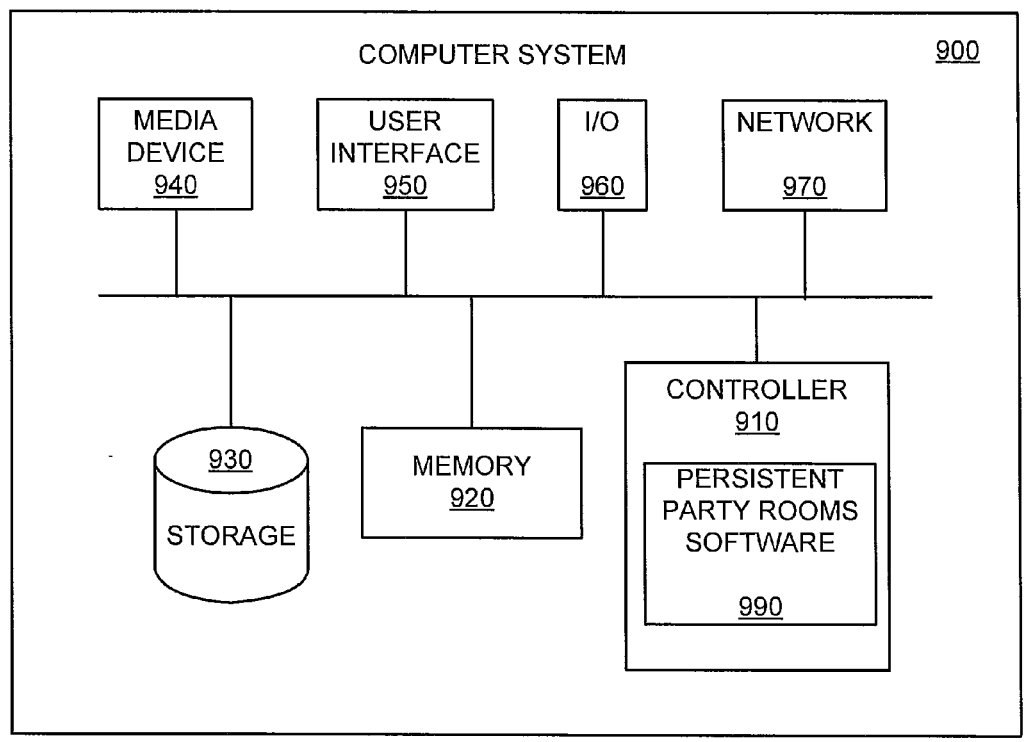
FIG. 9B is a functional block diagram illustrating the computer system hosting a logger in accordance with an implementation of the present application.

FIG. 9B illustrates a functional block diagram illustrating the computer system 900 hosting the persistent party room software 990 in accordance with an embodiment of the present disclosure. The controller 910 is a programmable processor and controls the operation of the computer system 900 and its components. The controller 910 loads instructions (e.g., in the form of a computer program) from the memory 920 or an embedded controller memory (not shown) and executes these instructions to control the system. In its execution, the controller 910 provides the persistent party room software 990 with a software system, such as to enable the creation, searching or joining of persistent party rooms. Alternatively, this service can be implemented as separate hardware components in the controller 910 or the computer system 900.

Memory 920 stores data temporarily for use by the other components of the computer system 900. In one implementation, memory 920 is implemented as RAM. In one implementation, memory 920 also includes long-term or permanent memory, such as flash memory and/or ROM.

Storage 930 stores data temporarily or long term for use by other components of the computer system 900, such as for storing data used by the persistent party room software 990. In one implementation, storage 930 is a hard disk drive.

The media device 940 receives removable media and reads and/or writes data to the inserted media. In one implementation, for example, the media device 940 is an optical disc drive.

The user interface 950 includes components for accepting user input from the user of the computer system 900 and presenting information to the user. In one implementation, the user interface 950 includes a keyboard, a mouse, audio speakers, and a display. The controller 910 uses input from the user to adjust the operation of the computer system 900.

The I/O interface 960 includes one or more I/O ports to connect to corresponding I/O devices, such as external storage or supplemental devices (e.g., a printer or a PDA). In one implementation, the ports of the I/O interface 960 include ports such as: USB ports, PCMCIA ports, serial ports, and/or parallel ports. In another implementation, the I/O interface 960 includes a wireless interface for communication with external devices wirelessly.

The network interface 970 includes a wired and/or wireless network connection, such as an RJ-45 or "Wi-Fi" interface (including, but not limited to 802.11) supporting an Ethernet connection.

The computer system 900 includes additional hardware and software typical of computer systems (e.g., power, cooling, operating system), though these components are not specifically shown in FIG. 9B for simplicity. In other implementations, different configurations of the computer system can be used (e.g., different bus or storage configurations or a multi-processor configuration). In one implementation, the computer system is a next generation game console from, for example, Sony Playstation®.

In one implementation, huge bandwidth savings may be experienced by using persistent party rooms. Because party rooms according to the current party room implementations are killed and re-created per session, persistent party rooms conserve large amounts of bandwidth resources by using bookmark pointers that store information about a give persistent party room. Furthermore, persistent party rooms avoid the bandwidth problems associated with star grid or mesh networks used when players are waiting in a lobby to play a game.

The description herein of the disclosed implementations is provided to enable any person skilled in the art to make or use the present application. Numerous modifications to these implementations would be readily apparent to those skilled in the art, and the principals defined herein can be applied to other implementations without departing from the spirit or scope of the present application. For example, although the specification describes persistent party rooms in the context of online games, these persistent party rooms can be used with any online or offline activity (offline in being based in an intranet, for example or local home network). In another example, the persistent party rooms can be used over computers or mobile devices, in addition to game consoles. Thus, the present application is not intended to be limited to the implementations shown herein but is to be accorded the widest scope consistent with the principal and novel features disclosed herein.

Various implementations of the present application are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present application. In addition, the grouping of functions within a module or step is for ease of description. Specific functions can be moved from one module or step to another without departing from the present application.

Additionally, the steps of a method or technique described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

All features of each above-discussed example are not necessarily required in a particular implementation of the present application. Further, it is to be understood that the description and drawings presented herein are representative of the subject matter which is broadly contemplated by the present application. It is further understood that the scope of the present application fully encompasses other implementations that may become obvious to those skilled in the art and that the scope of the present application is accordingly limited by nothing other than the appended claims.

The invention claimed is:

1. A method for using persistent party rooms for a cross-game chat, comprising:

initializing, via a computing device, a global array according to a hierarchical server architecture, wherein the hierarchical server architecture enables a user to create and host a persistent party room that always appears permanent in a graphical user interface but is terminable in the global array, the persistent party room is always open for chatting so that the user can invite friends and allow the friends to see what game the user is playing and join the game played by the user, and wherein the persistent party room enables chatting among the user and the friends regardless of different games that are being played by the user and the friends;

determining, via the computing device, whether there is a previously bookmarked persistent party room, and opening, via the computing device, the previously bookmarked persistent party room using a position indexed by a bookmark in the global array if there is a previously bookmarked persistent party room;

creating, via the computing device, a new persistent party room within a position indexed in the global array if there is no previously bookmarked persistent party room;

reserving a spot for a second user to join an online game played by the user via a joined game acknowledgment feature, the user and the second user belonging to a persistent party room, wherein the persistent party room being the new persistent party room or the previously bookmarked persistent party room, wherein the second user is permitted to reserve the spot only while being a member of the persistent party room;

notifying the second user the online game is full when there is no available space in the online game: and allowing the second user to join the online game in the reserved spot when the online game has available space.

2. The method of claim 1, wherein the hierarchical server architecture comprises a structure of at least one server having associated server IDs, each of the at least one server having at least one world having associated world IDs, and each of the at least one world having a least one room having associated room IDs.

3. The method of claim 2, wherein the global array is an array including the world IDs across servers, and wherein the global array is sorted by world ID to ensure uniformity across clients.

4. The method of claim 1, wherein creating the new persistent party room comprises:

calculating a bookmark ID by using a network platform ID and the current time;

adding up the data contained in the bookmark ID and storing the added up data in a new world-list-chunk value indexing a world ID out of the global array with a global array index and the new world-list-chunk value; and creating the new persistent party room using the indexed world ID.

5. The method of claim 4, wherein joining the previously bookmarked persistent party room comprises:

searching on the indexed world ID in the global array for the bookmark ID to determine if there is an existing persistent party room having the bookmark ID;

creating a new persistent party room having the bookmark ID and joining the new persistent party room when no persistent party rooms having the bookmark ID exist;

searching on the indexed world ID in the global array with the bookmark ID again to determine if there are any existing persistent party rooms having the bookmark ID; and joining that one returned persistent party room when only one persistent party room is returned in the search results having the bookmark ID.

6. The method of claim 4, wherein joining the previously bookmarked persistent party room comprises:

searching on the indexed world ID in the global array for the bookmark ID to determine if there is an existing persistent party room having the bookmark ID;

creating a new persistent party room having the bookmark ID and joining the new persistent party room when no persistent party rooms having the bookmark ID exist;

searching on the indexed world ID in the global array with the bookmark ID again to determine if there are any existing persistent party rooms having the bookmark ID;

verifying that the joined new persistent party room is the first one in the search results, when more than one persistent party room with the same bookmark ID exist; and joining the persistent party room that is the first one in the search results, when the joined new persistent party room is not the first one in the search results.

7. The method of claim 4, wherein joining the previously bookmarked persistent party room comprises:

searching on the indexed world ID in the global array for the bookmark ID to determine if there is an existing persistent party room having the bookmark ID;

joining the first persistent party room returned in the search results when more than one persistent party rooms having the bookmark ID exist.

8. The method of claim 4, wherein joining the previously bookmarked persistent party room comprises:

sorting the global array by world ID;

searching on the indexed world ID in the global array for the bookmark ID to determine if there is an existing persistent party room having the bookmark ID;

joining the first persistent party room returned in the search results, when more than one persistent party rooms having the bookmark ID exist.

9. A non-transitory computer-readable storage medium storing a computer program, the computer program comprising executable instructions that cause a computer to perform a method for using persistent party rooms, the method comprising:

initializing a global array according to a hierarchical server architecture, wherein the hierarchical server architecture enables a user to create and host a persistent party room that always appears permanent in a graphical user interface but is terminable in the global array, the persistent party room is always open for chatting so that the user can invite friends and allow the friends to see what game the user is playing and join the game played by the user, and wherein the persistent party room enables chatting among the user and the friends regardless of different games that are being played by the user and the friends;

determining whether there is a previously bookmarked persistent party room, and opening the previously bookmarked persistent party room using a position indexed by a bookmark in the global array if there is a previously bookmarked persistent party room;

creating a new persistent party room within a position indexed in the global array if there is no previously bookmarked persistent party room;

reserving a spot for a second user to join the online game via a joined game acknowledgment feature, the user and the second user belonging to a persistent party room, wherein the persistent party room being the new persistent party room or the previously bookmarked persistent party room, wherein the second user is permitted to reserve the spot only while being a member of the persistent party room;

notifying the second user the online game is full when there is no available space in the online game; and allowing the second user to join the online game in the reserved spot when the online game has available space.

10. The storage medium of claim 9, wherein the hierarchical server architecture comprises
  a structure of at least one server having associated server IDs, each of the at least one server having at least one world having associated world IDs, and each of the at least one world having at least one room having associated room IDs.

11. The storage medium of claim 9, wherein the global array is an array including the world IDs across servers, and
  wherein the global array is sorted by world ID to ensure uniformity across clients.

12. The storage medium of claim 9, wherein creating the new persistent party room comprises:
  calculating a bookmark ID by using a network platform ID and the current time;
  adding up the data contained in the bookmark ID in 16-bit chunks and storing the added up data in a new world-list-chunk value;
  indexing a world ID out of the global array with a global array index and the new word-list-chunk value; and
  creating the new persistent party room using the indexed world ID.

13. The storage medium of claim 12, wherein joining the previously bookmarked persistent party room comprises:
  searching on the indexed world ID in the global array for the bookmark ID to determine if there is an existing persistent party room having the bookmark ID;
  creating a new persistent party room having the bookmark ID and joining the new persistent party room when no persistent party rooms having the bookmark ID exist;
  searching on the indexed world ID in the global array with the bookmark ID again to determine if there are any existing persistent party rooms having the bookmark ID; and
  joining that one returned persistent party room when only one persistent party room is returned in the search results having the bookmark ID.

14. The storage medium of claim 12, wherein joining the previously bookmarked persistent party room comprises:
  searching on the indexed world ID in the global array for the bookmark ID to determine if there is an existing persistent party room having the bookmark ID;
  creating a new persistent party room having the bookmark ID and joining the new persistent party room when no persistent party rooms having the bookmark ID exist;
  searching on the indexed world ID in the global array with the bookmark ID again to determine if there are any existing persistent party rooms having the bookmark ID;
  verifying that the joined new persistent party room is the first one in the search results, when more than one persistent party room with the same bookmark ID exist; and
  joining the persistent party room that is the first one in the search results, when the joined new persistent party room is not the first one in the search results.

15. The storage medium of claim 12, wherein joining the previously bookmarked persistent party room comprises:
  searching on the indexed world ID in the global array for the bookmark ID to determine if there is an existing persistent party room having the bookmark ID;
  joining the first persistent party room returned in the search results when more than one persistent party rooms having the bookmark ID exist.

16. The storage medium of claim 12, wherein joining the previously bookmarked persistent party room comprises:
  sorting the global array by world ID;
  searching on the indexed world ID in the global array for the bookmark ID to determine if there is an existing persistent party room having the bookmark ID;
  joining the first persistent party room returned in the search results, when more than one persistent party rooms having the bookmark ID exist.

17. A system of using persistent party rooms, comprising:
  at least one computer system comprising persistent party room software;
  at least one server storing persistent party room information to be interfaced with the persistent party room software; and
  a network connecting the at least one computer system and the at least one server,
  wherein the persistent party room software comprises:
  initialization means to initialize a global array according to a hierarchical server architecture within the persistent party room information stored by the at least one server,
  wherein the hierarchical server architecture enables a user to create and host a persistent party room that always appears permanent in a graphical user interface but is terminable in the global array, the persistent party room is always open for chatting so that the user can invite friends and allow the friends to see what game the user is playing and join the game played by the user, and
  wherein the persistent party room enables chatting among the user and the friends regardless of different games that are being played by the user and the friends;
  determination means to determine whether there is a previously bookmarked persistent party room, and opening the previously bookmarked persistent party room using a position indexed by a bookmark in the global array if there is a previously bookmarked persistent party room; and
  creation means to create the new persistent party room within a position indexed in the global array if there is no previously bookmarked persistent party room;
  reservation means to reserve a spot for a second user to join the online game via a joined game acknowledgment feature, the user and the second user belonging to a persistent party room,
  wherein the persistent party room being the new persistent party room or the previously bookmarked persistent party room,
  wherein the second user is permitted to reserve the spot only while being a member of the persistent party room;
  notification means to notify the second user the online game is full when there is no available space in the online game: and
  joining means to allow the second user to join the online game in the reserved spot when the online game has available space.

* * * * *